United States Patent

[11] 3,588,729

| [72] | Inventor | Marion M. Satterfield<br>Oak Ridge, Tenn. |
|---|---|---|
| [21] | Appl. No. | 834,429 |
| [22] | Filed | June 18, 1969 |
| [45] | Patented | June 28, 1971 |
| [73] | Assignee | The United States of America as represented by the United States Atomic Energy Commission |

[54] NONBLOCKING PREAMPLIFIER
3 Claims, 5 Drawing Figs.

| [52] | U.S. Cl. | 330/207P, 330/110, 330/35 |
|---|---|---|
| [51] | Int. Cl. | H03f 21/00 |
| [50] | Field of Search | 330/110, 103, 26, 35, 3, 24 |

[56] References Cited
UNITED STATES PATENTS

| 3,058,068 | 10/1962 | Hinrichs et al. | 330/10 |
|---|---|---|---|
| 3,121,199 | 2/1964 | Harrison | 330/110X |
| 3,248,569 | 4/1966 | Weekes | 330/103X |
| 3,413,561 | 11/1968 | Hogan | 330/103X |

*Primary Examiner*—Nathan Kaufman
*Attorney*—Roland A. Anderson

ABSTRACT: An improved preamplifier for nuclear pulse amplifiers has been provided which does not saturate when presented with an overload pulse. A field effect transistor circuit functions to greatly reduce the preamplifier discharge time constant and cancel the input charge under overload conditions but is nonoperative otherwise, thereby reducing the dead-time under overload input conditions.

INVENTOR.
Marion M. Satterfield

Patented June 28, 1971

INVENTOR.
Marion M. Satterfield

BY

ATTORNEY.

3,588,729

NONBLOCKING PREAMPLIFIER

BACKGROUND OF THE INVENTION

The present invention was made during the course of, or under, a contract with the U.S. Atomic Energy Commission.

The present invention relates generally to nuclear pulse amplifiers and more specifically to a charge-sensitive preamplifier having an active circuit in the feedback loop for cancelling overloading charges applied to the input thereof.

A common method of detecting gamma radiation involves scintillation spectrometry. As is well known, when a gamma ray is absorbed in certain types of crystal it causes a scintillation in the crystal, the amount of light being closely proportional to the energy deposited. The light is converted into an electrical pulse by a photomultiplier tube, and the energy of the gamma ray can be determined by measuring the quantity of charge in this pulse. An integrator is normally used to convert the charge to a voltage whose amplitude is proportional to the energy of the incident gamma ray. This conversion is followed by the necessary amplification to provide voltage pulses of sufficient magnitude to be used in pulse-height analysis.

One of the problems associated with the use of scintillation crystals is their response to cosmic rays. The hard or penetrating component of the cosmic flux at sea level is primarily the mu meson or muon. Muons carry the same charge as electrons and positrons, but their mass is 207 times as great. They can penetrate several hundred meters of solid rock, so it is easy for an energetic muon to pass through a detector's shield and deposit a few mev. of energy in the scintillation crystal. Because of their energy, these cosmic rays are responsible for very large electrical pulses at the output of the photomultiplier tube. While the normal pulses to be analyzed are usually much less than a volt, the cosmic ray developed pulses may be in the dozens of volts. These large photomultiplier pulses overload conventional preamplifiers and the counting system is blocked to pulses of interest for a undesirable length of time. The magnitude of the overload from a cosmic ray increases with the size of the scintillation detector since a large crystal can absorb more energy than a small detector as well as intercept more cosmic rays.

In the past, various techniques have been used to minimize the effect of overloads in pulse amplifiers. Pole-zero cancellation techniques, for example, have been applied to the design of filters following the preamplifier to reduce the decay time of an overloading pulse. All of the known techniques treat the signal following the saturated preamplifier and the common practice is to expect the overload conditions, design for a high overload tolerance and to state a recovery time for a specified overload.

SUMMARY OF THE INVENTION

It is an object of this invention to provide a nonblocking preamplifier for nuclear pulse amplifiers which does not saturate when subjected to an overloading pulse input.

It is another object of this invention to provide a preamplifier which cancels overloading pulses at the input of the preamplifier but does not affect the pulses of interest.

Further, it is another object of this invention to provide an active circuit in conjunction with the normal feedback loop of a charge-sensitive preamplifier which is nonoperative except upon the appearance of an overloading pulse at the output thereof; at which time the active circuit operates to supply the large overload current to the photomultiplier as well as decreasing the time constant in the normal feedback loop, thereby cancelling the overload charge and providing a prompt return to linear operation.

Other objects and many of the attendant advantages of the present invention will be evident from the following detailed description.

Briefly, the present invention is a nonsaturating preamplifier for blocking overload pulses in a nuclear pulse amplifier, comprising: an inverting operational amplifier; a parallel R–C feedback circuit connected across said operational amplifier; and an active gating means connected in parallel with said R–C feedback circuit and operable in response to a predetermined overloading voltage level sensed at the output of said operational amplifier for gating the output of said operational amplifier back to the input in opposing polarity so as to cancel said overloading pulse at the input of the preamplifier.

DETAILED DESCRIPTION OF THE PREFERRED EMBODIMENT

Figure 1:
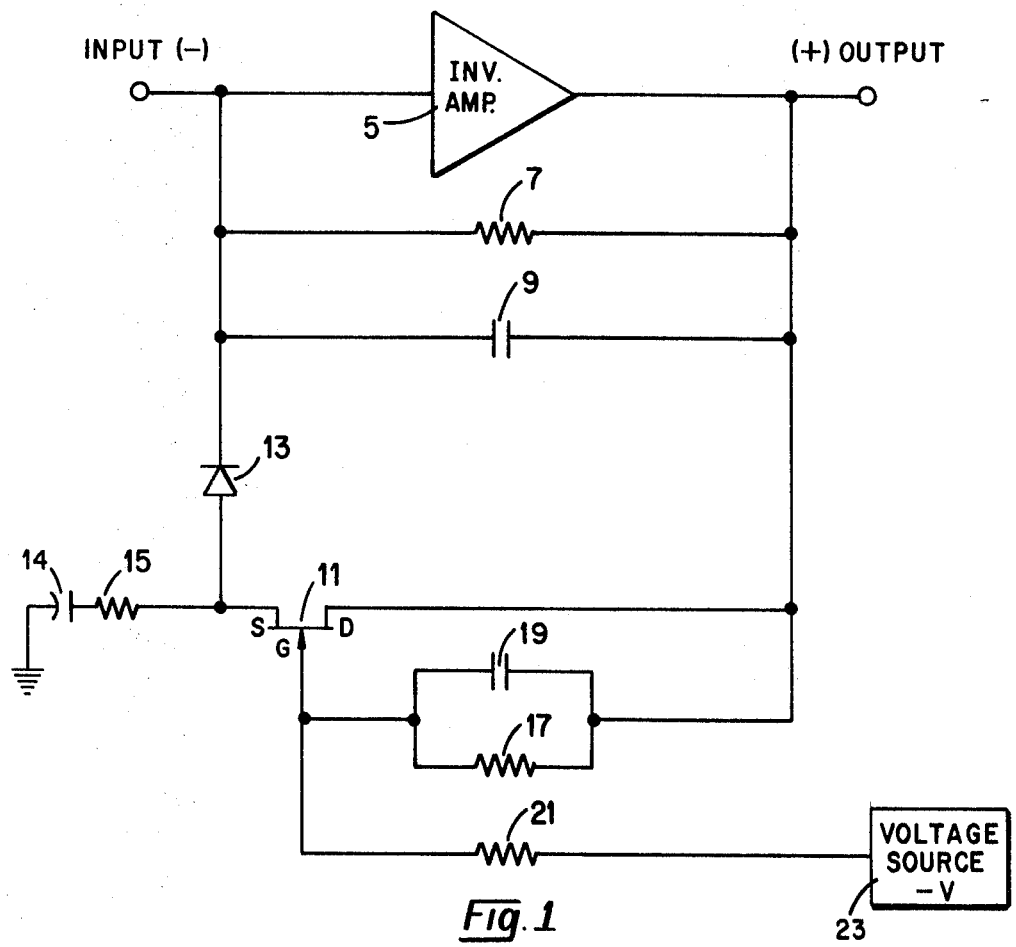
FIG. 1 is a schematic diagram of a nonblocking preamplifier according to the present invention.

Referring now to FIG. 1, there is shown an inverting operational amplifier 5 which accepts a negative input and produces a positive amplified output. The amplifier is connected as a signal integrator in a conventional manner as by the parallel R–C feedback circuit consisting of resistor 7 and capacitor 9 connected between the input and the output of amplifier 5. A transitor having input, output and control electrodes, typically a field effect transistor 11 (F.E.T.) having a drain, source, and gate electrode, respectively, is connected with the drain electrode coupled to the output of amplifier 5 and the source electrode connected through a diode 13 to the input of amplifier 5. To prevent voltage fluctuations across diode 13, its anode may be connected to ground through a series capacitor 14 and resistor 15. These elements prevent voltage changes across the diode during normal conditions so that the capacitance of diode 13 does not change. Some commercial diodes exhibit a fixed capacitance under varying reverse bias voltages, thus resistor 15 and capacitor 14 would not be required with such diodes. The gate electrode G of the F.E.T. is connected to the drain electrode D through a parallel R–C network consisting of resistor 17 and capacitor 19. The gate electrode is further connected to a negative voltage source 23 through a biasing resistor 21.

In operation, a normal charge from a photomultiplier tube (not shown) is converted to a voltage output, typically of less than 1 volt in magnitude, which is proportional to the total input charge. Such an output has no effect on the gate of transistor 11 because the bias applied from voltage source 23 is sufficient to keep the gate negatively biased.

An overloading input pulse, however, drives the preamplifier to a very high positive level that would normally result in preamplifier saturation. This increasing output voltage drives the gate of transitor 11 in the direction of positive bias causing this transitor to conduct and supply the current demanded by the photomultiplier, thereby preventing an excessive charge from accumulating on capacitor 9. The result is that the output voltage of amplifier 5 rises to a value set by resistor 17 and resistor 21 and holds this value until the photomultiplier and associated crystal scintillator recover from the overload. At this time, transistor 11 ceases to conduct and the preamplifier is back in linear operation and ready for the next pulse.

EXAMPLE

Figure 2:
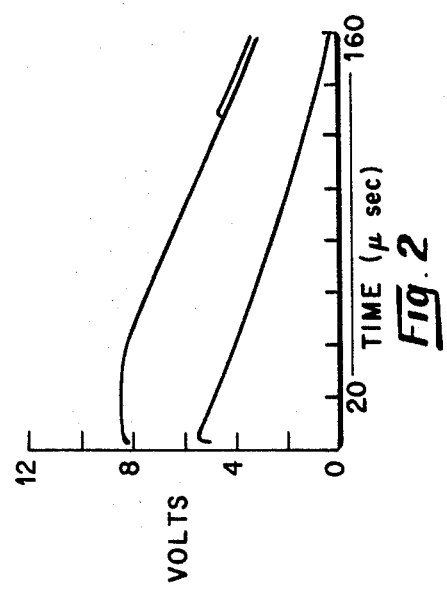
FIG. 2 is an oscilloscope trace of a typical preamplifier under saturation.

A conventional preamplifier as shown in FIG. 1, but without the overload blocking circuit, was connected to a conventional photomultiplier tube associated with the output of a 5-inch by 3-inch NaI crystal detector. The preamplifier was substantially equivalent to that shown and described in copending Pat. application Ser. No. 805,262, filed Mar. 7, 1969, and having a common assignee with the present application. The output of the preamplifier was recorded on an oscilloscope and a typical trace is shown in FIG. 2. As shown by the flat portion of the upper trace, the amplifier is saturated for approximately 40 microseconds due to an overload pulse input.

Figure 3:
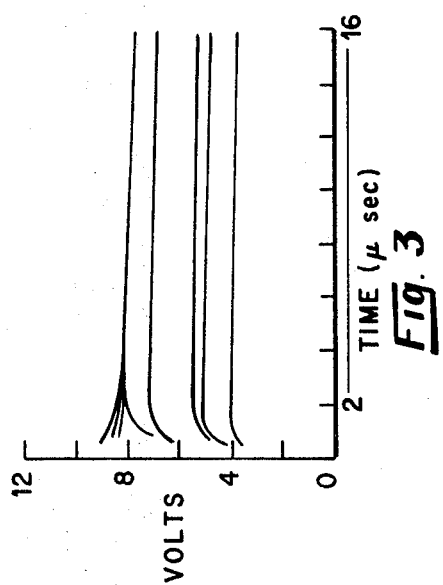
FIG. 3 is an oscilloscope trace of the output of the present preamplifier showing saturation does not take place under overload conditions.

The output of the same preamplifier, with the blocking circuit connected and operated under the same conditions as above, was recorded as shown in FIG. 3. As indicated in the FIG., the time scale was expanded to more clearly show the response. It is clearly illustrated here by the nonflattened response of the upper trace that saturation does not occur. The response shown in FIG. 3 is a marked improvement in the art of handling overload pulses.

Figure 5:
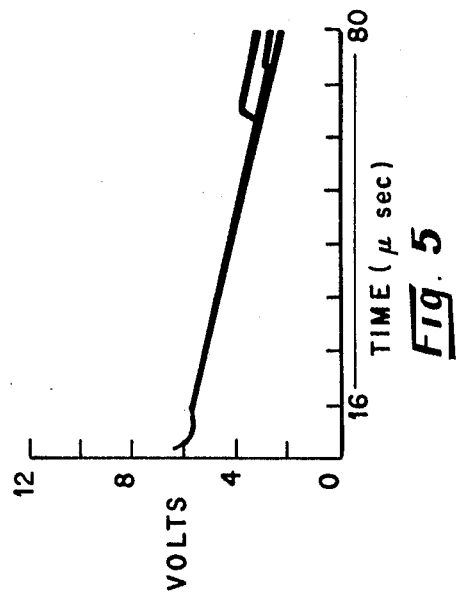
FIG. 5 is an oscilloscope trace of the output of the present preamplifier driven by the same detector as in FIG. 4 showing saturation does not occur.
Figure 4:
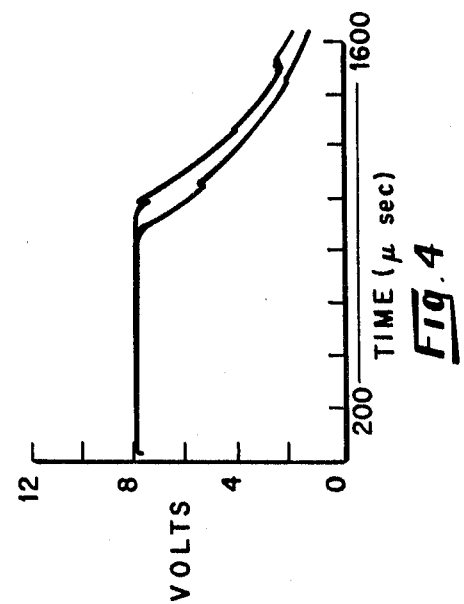
FIG. 4 is an oscilloscope trace of a typical preamplifier output used with large crystal detector showing saturation.

The effectiveness of the present circuit is further demonstrated in FIGS. 4 and 5 which illustrate the response of the preamplifier when connected to the output of a photomultiplier tube associated with a large crystal detector, a 9¼-inch by 9-inch NaI Crystal. FIG. 4 depicts the usual saturation, without the transistor overload blocking circuit, due to the large overload pulses, while FIG. 5 shows the same preamplifier output with the circuit connected. Again, by using an expanded time scale, it is clearly seen that saturation does not occur. Approximately 10 microseconds were needed for the sodium iodide crystal and photomultiplier to recover from the overload.

Thus, it will be seen that a nonblocking preamplifier has been provided which eliminates saturation and thereby deadtime of the preamplifier due to the application of overload pulses. One problem, due to overloads, has therefore been eliminated from the nuclear pulse counting systems.

Obviously, numerous modifications may be made within the spirit and scope of the present invention, therefore, the invention should be considered limited only by the following claims attached to and forming a part of this specification.

I claim:

1. A nonsaturating preamplifier for cancelling overload pulses in a nuclear pulse amplifier, comprising:
   an inverting operational amplifier having an input and an output;
   a parallel R-C feedback circuit connected between the input and output of said operational amplifier; and
   a unidirectional conducting means including a transistor having current input, output and control electrodes, said input electrode being connected to said output of said amplifier, means including a parallel resistance and capacitance network connected between said control electrode and input electrodes of said transistor, a voltage biasing means connected to said control electrode of said transistor, and a diode connected between said output electrode and said input of said amplifier, said diode being connected so as to block current from said transistor flowing into the input of said amplifier.

2. A preamplifier as set forth in claim 1 wherein said transistor is a field-effect transistor having drain, source, and gate electrodes corresponding to said input, output and control electrodes, respectively.

3. A preamplifier as set forth in claim 1 wherein said biasing means including a voltage source having a predetermined value and opposite in polarity to that of the signal output of said amplifier and a resistor connected between said control electrode of said transistor and said voltage source.